United States Patent [19]
Murakami et al.

[11] Patent Number: 5,519,799
[45] Date of Patent: May 21, 1996

[54] OPTICAL FIBER ARRAY STRUCTURE

[75] Inventors: Kazuya Murakami; Tatsuo Teraoka; Shin-ichi Kajiyama, all of Ibaraki; Takeshi Kato, Tokyo, all of Japan

[73] Assignees: Hitachi Cable, Ltd.; Hitachi, Ltd., both of Tokyo, Japan

[21] Appl. No.: 335,652

[22] Filed: Nov. 8, 1994

[30] Foreign Application Priority Data

Mar. 8, 1994 [JP] Japan ................................. 6-036854

[51] Int. Cl.$^6$ .................................................. G02B 6/36
[52] U.S. Cl. .................... 385/78; 385/66; 385/84
[58] Field of Search ................................ 385/60, 66, 78, 385/80, 84, 49, 50

[56] References Cited

U.S. PATENT DOCUMENTS

| 4,762,388 | 8/1988 | Tanaka et al. | 385/60 |
| 5,071,219 | 12/1991 | Yurtin et al. | 385/78 |
| 5,253,315 | 10/1993 | Fentress | 385/78 |

Primary Examiner—Rodney B. Bovernick
Assistant Examiner—Robert E. Wise
Attorney, Agent, or Firm—Helfgott & Karas

[57] ABSTRACT

In an optical fiber array structure, a ferrule is provided around an optical fiber array. The ferrule has an outer configuration defined by combination of, preferably, two circles. Thus, eye glass-shaped outer configuration is obtained for the ferrule. The adapter has an aperture for receiving the ferrule, and the aperture has an inner configuration which is complementary with the outer configuration of the ferrule.

11 Claims, 7 Drawing Sheets

OPTICAL FIBER ARRAY STRUCTURE

FIELD OF THE INVENTION

The Invention relates to an optical fiber array structure, and more particularly to, the improvement on optical axial alignment of connected optical fibers arranged in an array.

BACKGROUND OF THE INVENTION

A first conventional optical fiber array comprises optical fibers arranged in an array between a substrate and a pressing plate, wherein the optical fibers are positioned in V-grooves on the substrate to be extended out of a tape fiber. Such optical fiber arrays are fixed to be connected by adhesive, such that the optical fibers are optically aligned at facing ends of corresponding optical fibers.

A second conventional optical fiber array comprises a resin molded ferrule in which optical fibers are arranged in an array to be extended out of a tape fiber. In connecting the optical fiber arrays, male and female ferrules are prepared to be optically connected in accordance with the assistance of guide pins to provide the axial alignment of the optical fibers between the male and female ferrules.

In the first conventional optical fiber array, however, there is a disadvantage in that manual operation takes a long time to provide the optical axial alignment of the optical fibers which is carried out by placing the optical fiber arrays on a finely moving mount. When the finely moving mount is replaced by an automatical alignment apparatus, cost is increased due to high price of the automatical alignment apparatus.

In the second conventional optical fiber array, there is a disadvantage in that connecting operation is troublesome, because the guide pins which are separated from the ferrules are used. If the guide pins are fixed to one of the male and female ferrules, it becomes difficult to clean the end surfaces of the optical fibers.

In order to overcome these disadvantages in the first and second conventional optical fiber arrays, the inventors have proposed first and second optical fiber array structures in which adapters having guide apertures are used.

In the first proposed optical fiber array structure, the V-groove substrate and the pressing plate in the first conventional optical fiber array are made by zirconia.

However, the precision of a thickness and a width of the optical fiber array having a cross-section of rectangle is limited to ±5 μm.

In the second proposed optical fiber array structure, the cross-section of the first proposed optical fiber array is changed to be circular, because the circular shape is easier in fabrication to increase the precision of the optical axial alignment.

However, the circular optical fiber array is rotated in a circular guide aperture of the adapter to lower the precision of the optical axial alignment.

SUMMARY OF THE INVENTION

Accordingly, it is an object of the invention to provide an optical fiber array structure in which operation is easy and cost is low.

It is a further object of the invention to provide an optical fiber array structure in which end surfaces of an optical fiber array and optical fibers are cleaned without difficulty.

It is a still further object of the invention to provide an optical fiber array structure in which high precision of the optical axial alignment is obtained at a joint to lower connecting loss of optical fibers.

According to the invention, an optical fiber array structure, comprises:

an optical fiber array comprising a plurality of optical fibers arranged in an array; and a ferrule provided around the optical fiber array, the optical fibers being exposed on an end plane of the ferrule to be coplanar with the end plane;

wherein the ferrule is of an outer configuration defined by combination of at least two circles.

According to a further feature of the invention, an optical fiber array structure, comprises:

an optical fiber array comprising a plurality of optical fibers arranged in an array;

a ferrule provided around the optical fiber array, the optical fibers being exposed on an end plane of the ferrule to be coplanar with the end plane; and an adapter having a guide aperture for receiving one end of the ferrule;

wherein the ferrule is of an outer configuration defined by combination of at least two circles; and the guide aperture is of an inner configuration which is complementary with the outer configuration of the ferrule.

BRIEF DESCRIPTION OF THE DRAWINGS

The invention will be explained in more detail in conjunction with appended drawings, wherein.

DESCRIPTION OF THE PREFERRED EMBODIMENTS

Before describing an optical fiber array in a preferred embodiment according to the invention, the aforementioned conventional optical fiber arrays will be explained in more detail.

Figure 1A:
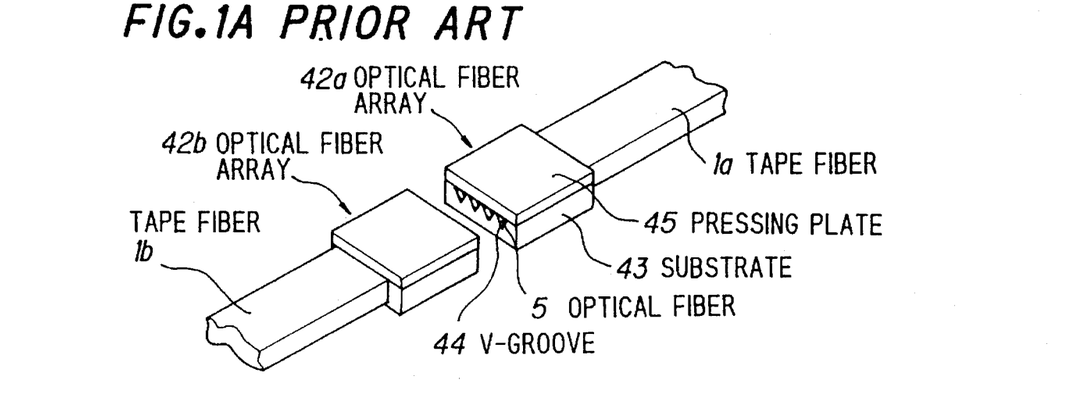
FIGS. 1A and 1B are perspective views showing a first conventional optical fiber array.
Figure 1B:
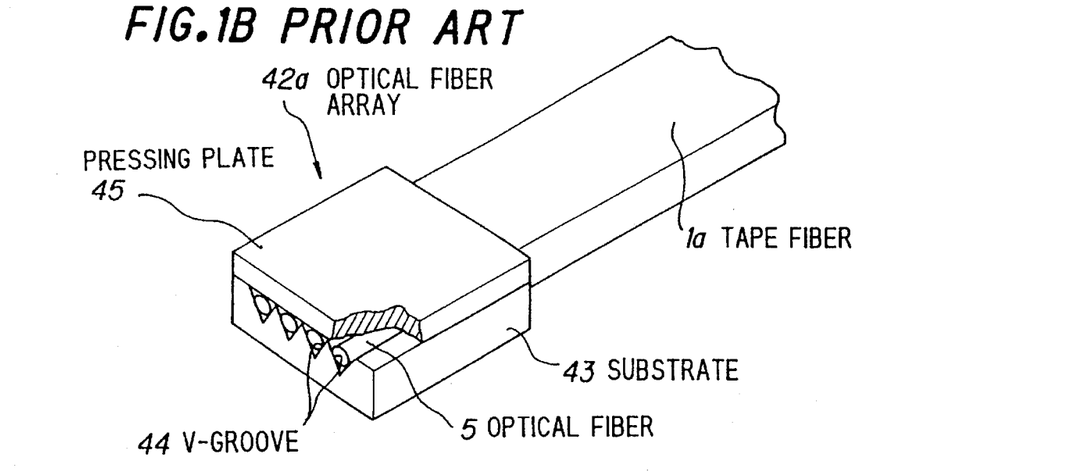

FIGS. 1A and 1B show the first conventional optical fiber array which comprises optical fibers 5 arranged in V-grooves 44 provided on a substrate 43. The optical fibers 5 are appropriately pressed in the V-grooves 44 on the substrate 43 by a pressing plate 45, and fixed therein by using adhesive or solder, wherein the optical fibers 5 are extended out of an optical tape fiber 1a or 1b to the optical fiber array designated by the reference numeral 42a or 42b.

In the optical fiber arrays 42a and 42b, where the optical fibers 5 are single mode optical fibers, a diameter of a core in each of the optical fibers 5 is as small as approximately 10 µm. For this dimension, an optical axis alignment which is less than 1 µm is required between each corresponding optical fibers 5 of the optical fiber arrays 42a and 42b.

In optically connecting the optical fiber arrays 42a and 42b, the optical fiber arrays 42a and 42b are placed on a finely moving mount, so that an axial alignment is obtained in accordance with the fine movement. Then, the optical fibers 5 are permanently coupled between the optical fiber arrays 42a and 42b by using adhesive.

Figure 2:
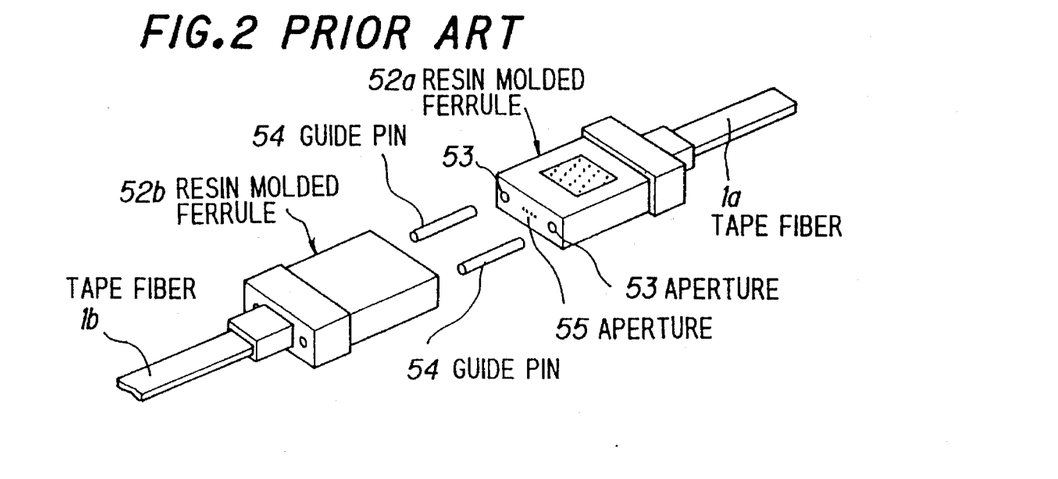
FIG. 2 is a perspective view showing a second conventional optical fiber array.

FIG. 2 shows the second conventional optical fiber array which is called a MT connector (Mechanically Transferable connector). The MT connector comprises resin molded ferrules 52a and 52b fixed to ends of optical tape fibers 1a and 1b. The ferrule 52a is provided with plural apertures 55, into which optical fibers (not shown) inside the ferrule 52b are inserted, and a pair of apertures 53, into which a pair of guide pins 54 are inserted in cooperative relation with apertures (not shown) provided in the ferrule 52b.

In accordance with the development of mold-fabricating technology and precision molding technology, the guide pin-inserting apertures 53, and the optical fiber-inserting apertures 55 are obtained with precision as high as less than 1 µm. Consequently, the connection loss can be reduced to be less than 1 dB.

The inventors have proposed first and second types of optical fiber array structures to overcome disadvantages of the first and second conventional optical fiber arrays as explained in FIGS. 1A and 1B, and FIG. 2.

Figure 3:
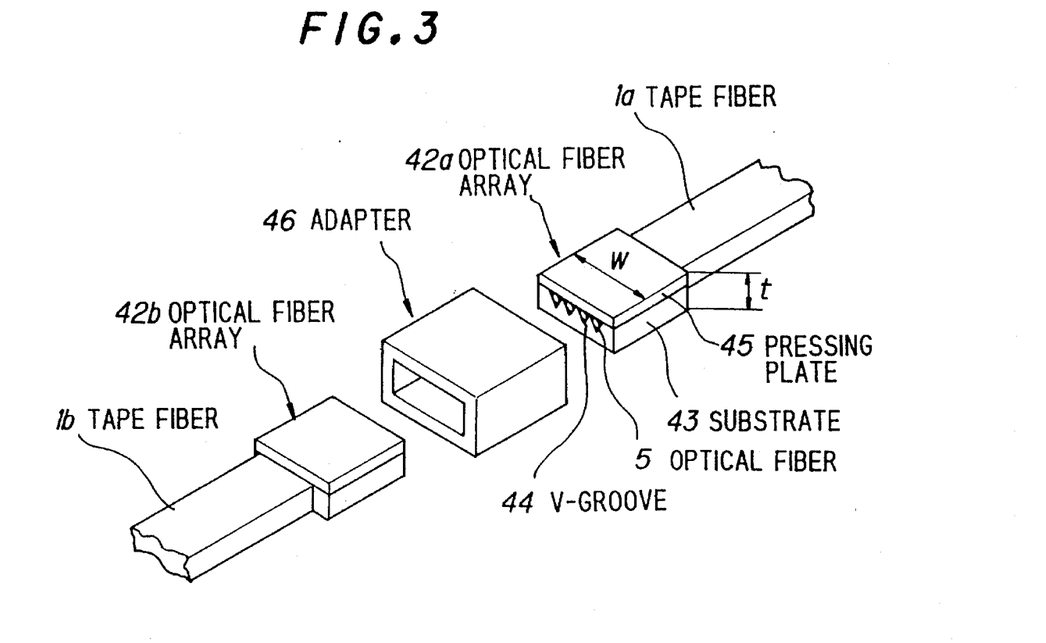
FIGS. 3 and 4 are perspective views showing first and second optical fiber array structures proposed by the inventor.

The first type of the proposed optical fiber array structure comprises an adapter 46 functioning as a guide sleeve into which the arrays 42a and 42b are inserted to optically connect the optical fibers 5, wherein like parts are indicated by like reference numerals as used in FIGS. 1A and 1B, and all parts of the optical fiber arrays 42a and 42b and the adaptor 46 are made of zirconia.

In the proposed optical fiber array structure, the axial alignment of the optical fibers 5 is obtained in accordance with inner precision of the adaptor 46 and outer precision of the arrays 42a and 42b. Practically, however, the precisions in thickness t and width W of the arrays 42a and 42b can not be high less than approximately ±5 µm, because the cubic substrate 43 and the cubic pressing plate 45 are fixed to provide a combined structure.

Figure 4:
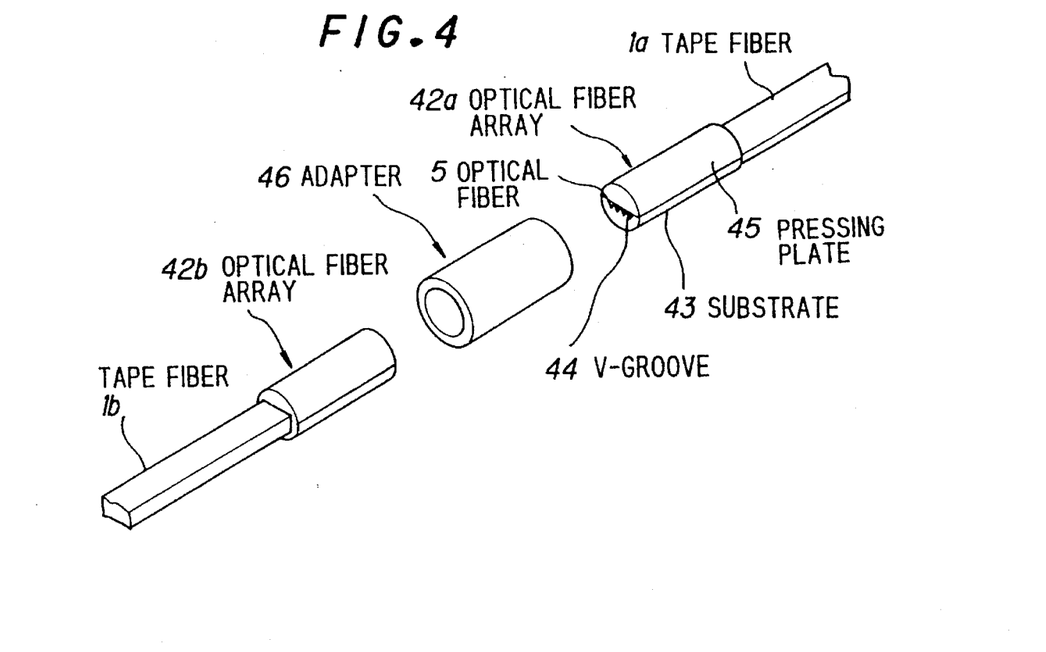

The second type of the proposed optical fiber array structure comprises a cylindrical adaptor 46 functioning as a guide sleeve into which a cylindrical arrays 42a and 42b are inserted to optically connect the optical fibers 5, wherein like parts are indicated by like reference numerals as used in FIG. 3.

In the second proposed optical fiber array, the cylindrical arrays 42a and 42b are made of zirconia to provide the precision in outer configuration as high as less than 1 µm.

Next, an optical fiber array structure in the first preferred embodiment according to the invention will be explained in FIGS. 5A and 5B.

Figure 5A:
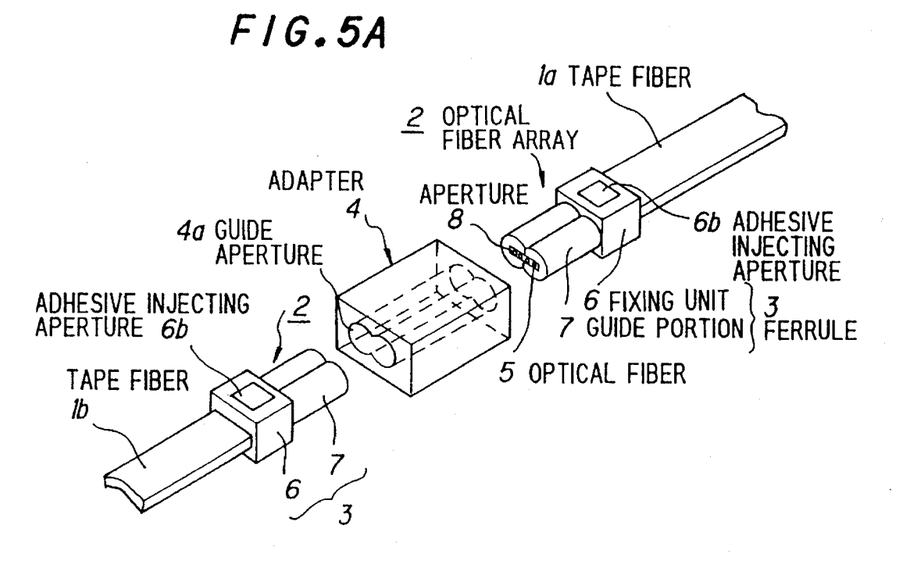
FIGS. 5A and 5B are perspective views showing an optical fiber array structure in a first preferred embodiment according to the invention.
Figure 5B:
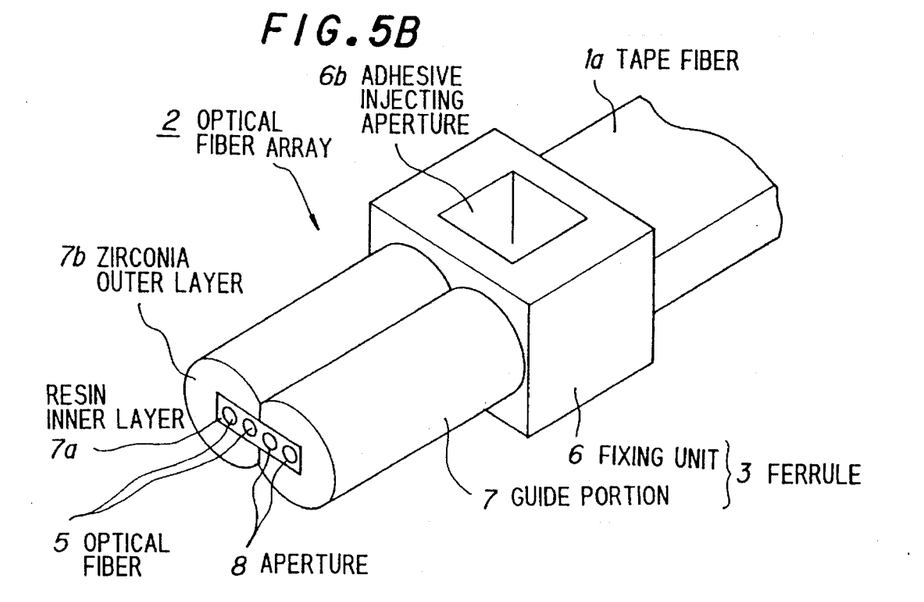

In FIGS. 5A and 5B, there are shown the optical fiber arrays 2 which are provided at ends of tape fibers 1a and 1b each comprising a plurality of optical fibers, for instance, four optical fibers 5. Each of the optical fiber arrays 2 comprises a multiple-core ferrule 3 composed of a fixing unit 6 and a guide portion 7. In this optical fiber array 2, the fixing unit 6 has an aperture 6b for injecting adhesive and connects the tape fiber 1a (or 1b) to the guide portion 7, and the guide portion 7 comprises an inner resin layer 7a having apertures 8 for holding the optical fibers 5 and an outer hard layer 7b of zirconia ceramics having an eye glass-shaped configuration (not circular, but combination of two circles) for covering the inner resin layer 7a.

Figure 6:
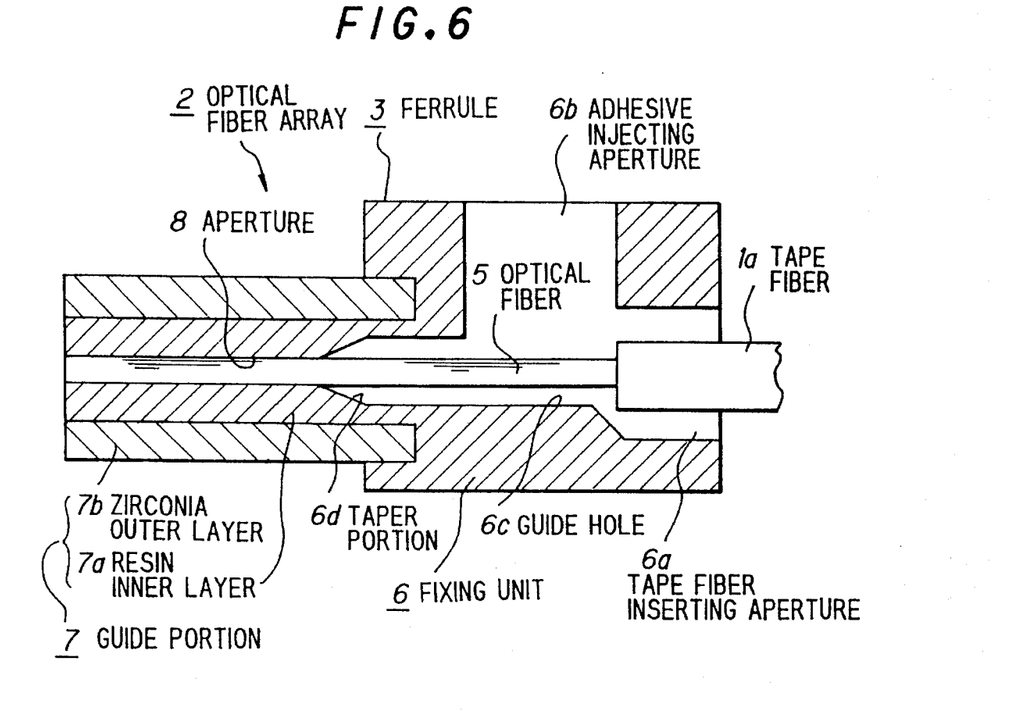
FIG. 6 is a cross-sectional view showing an enlarged portion in the first preferred embodiment.

FIG. 6 shows the multiple-core ferrule 3 comprising the fixing unit 6 and the guide portion 7 in more detail. In the multiple-core ferrule 3, the fixing unit 6 is provided with an aperture 6a for inserting the tape fiber 1a (or 1b), and the aperture 6b for injecting adhesive to fix the tape fiber 1a (or 1b) and the optical fibers 5 to the inner walls of a guide hole 6c, the inserting aperture 6a, etc., and the guide portion 7 comprises the inner resin layer 7a which is integral with the fixing unit 6, and the outer hard layer 7b, wherein the holding apertures 8 are communicated via a taper portion 6d to the guide hole 6c.

In the optical fiber array structure, an adapter having a guide aperture 4a of an inner configuration which conforms with the outer configuration of the guide portion 7 by a clearance of approximately 0.5 µm therebetween is used to optically connect the optical fibers 5 of the guide portions 7 extended from the tape fibers 1a and 1b. That is, the guide portions 7 are inserted into the guide aperture 4a from the both sides of the adapter 4, so that the optical fibers 5 are aligned on axes of cores in accordance with the inner and outer configurations of the guide aperture 4a of the adapter 4 and the guide portions 7 of the multiple-core ferrules 3. The guide aperture 4a of the adapter 4 is formed by the machining of a cubic material.

The optical fiber array 2 in the first preferred embodiment will be fabricated as set out below.

Figure 7A:
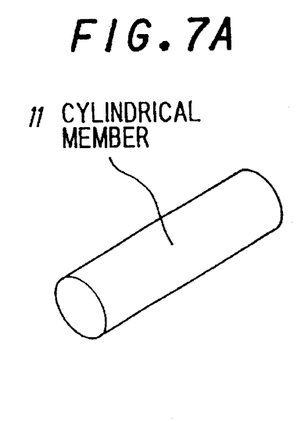
FIGS. 7A to 7C are perspective views showing a process for fabricating a sleeve used for a guide portion of a ferrode in the first preferred embodiment.

In FIG. 7A, a pair of cylindrical members 11 are prepared by zirconia.

Figure 7B:
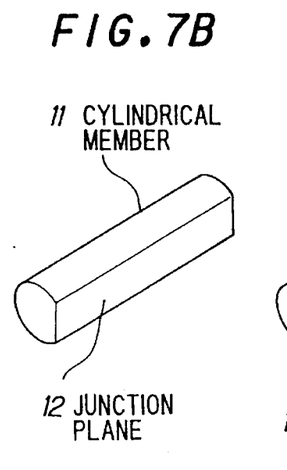

In FIG. 7B, each of the cylindrical members 11 is longitudinally polished to provide a junction plane 12 on one side thereof.

Figure 7C:
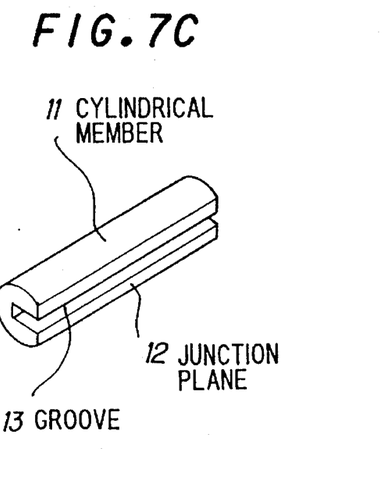

In FIG. 7C, a straight groove 13 is longitudinally formed by machining the junction plane 12.

Then, the cylindrical members 11 thus machined are placed in a mold (not shown), such that the junction planes 12 are in contact with each other for the grooves 13 to face each other, and thermo-setting epoxy resin filled with glass fiber is injected into the mold. Consequently, the multiple-core ferrule 3 as shown in FIG. 6 is obtained out of the mold. In the molded ferrule 3, the holding apertures 8 are formed by arranging pins equal in number and size to the holding apertures 8 in the mold. The mold may be provided with a pair of parallel V-grooves in which the cylindrical members 11 are placed with high precision for parallelism and interval thereof.

On the experimental basis, the four holding apertures 8 are formed with a pitch of 0.25 mm. As a result, the precision which is as low as less than 1 µm is obtained in regard to the outer configuration of the guide portions 7, and the precision which is as low as less than 1 µm is also obtained in regard to the arrangement of the holding apertures 8.

In assembly of the multiple-core ferrule 3, sheaths of the tape fibers 1a and 1b are removed to expose the optical fibers 5 by using an exclusive-use tool, and the exposed optical fibers 5 are smoothly inserted into corresponding ones of the holding apertures 8 by sliding along the taper portion 6d via the guide hold 6c from the inserting aperture 6a. Then, adhesive is injected from the injecting aperture 6b into the interior of the fixing unit 6 to fix the optical fibers 5 therein. Finally, the end planes of the optical fibers 5 and the guide portions 7 are polished to provide mirror surfaces thereon, thereby decreasing coupling loss of the optically coupled optical fibers 5.

In optically coupling the optical fibers 5 of the guide portions 7, the guide portions 7 are precisely positioned in the radial direction in accordance with the eye glass-shaped (non-circular) configurations of the guide aperture 4a of the adapter 4 and the guide portions 7, and the use of zirconia providing high precision on the outer configuration of guide portions 7. As a matter of course, the axial alignment of the optical fibers 5 is also obtained. The use of zirconia for the guide portions 7 further provides the smooth insertion thereof into the guide aperture 4a of the adapter 4, and the durability thereof because of non-defective surfaces of the guide portions 7 even in case of repeated usage. In addition to these advantageous features, the inner layer 7a of the guide portion 7 is made of resin as described before. For this structure, the holding apertures 8 are arranged with high precision to provide low loss in optically coupling the optical fibers 5 without the provision the V-grooves as shown in FIGS. 1A, 1B and 3. This will make the fabrication of the optical ferrules 3 easier.

In one experiment in the first preferred embodiment, a clearance is set to be 0.5 μm between the guide portions 7 and the guide aperture 4a of the adapter 4, and five sets of connections are carried out by using ten optical fiber arrays 2 each having four optical fibers 5. As a result, connection characteristics which are improved by a mean connection loss of 0.3 dB, and the maximum connection loss of 1 dB are obtained. Further, the deviation of loss is less than 0.3 dB in the repetitive connection of the optical fiber arrays 2.

In the first preferred embodiment, the number of the optical fibers 5 is not limited to four, and the outer hard layer 7b of the guide portion 7 may be made of ceramics such as alumina, silicon carbonate, silicon nitride, etc., and a glass such as quartz, Pyrex (trademark), etc. Further, the optical fiber array 2 for the tape fiber 1a may be connected to a light emitting device array of laser diodes, etc., a light receiving device array of photodiodes, etc., and an optical waveguide array of quartz systems, etc. in place of the optical fiber array 2 for the tape fiber 1b.

Figure 8:
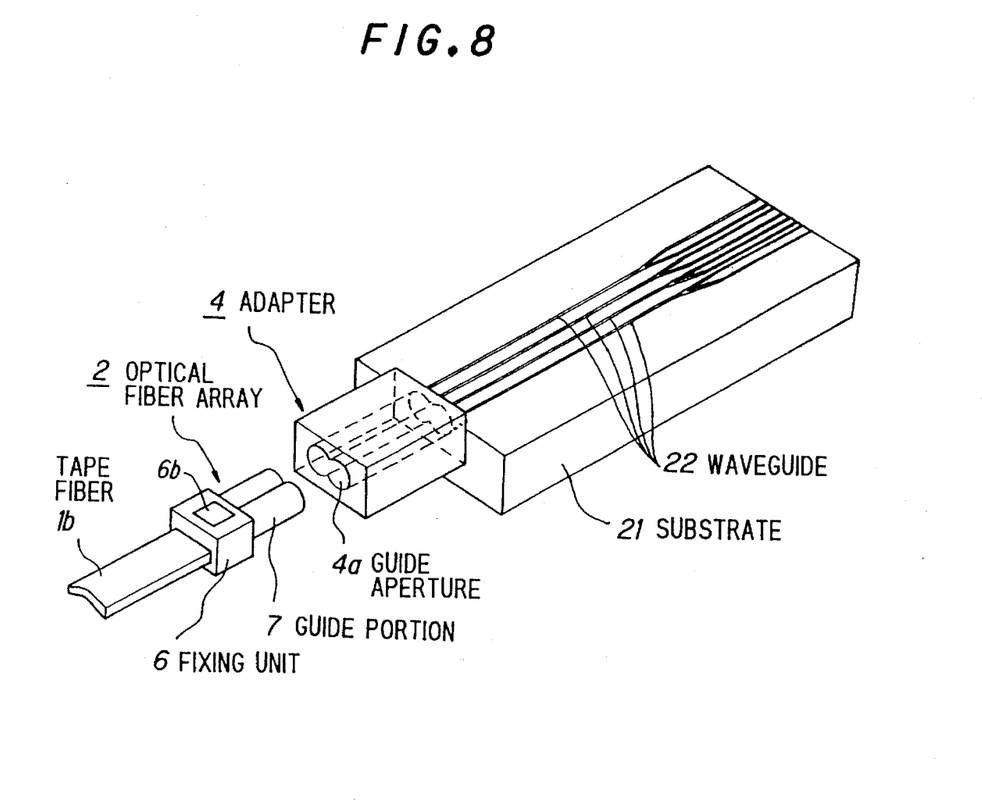
FIG. 8 is a perspective views showing an optical fiber array structure in a second preferred embodiment according to the invention.

FIG. 8 shows an optical fiber array structure in the second preferred embodiment according to the invention, wherein like parts are indicated by like references as used in the first preferred embodiment.

In the second preferred embodiment, waveguides 22 are provided on a quartz system substrate 21, and the adapter 4 having the guide aperture 4a is fixed to the substrate 21, such that the optical fibers (not shown) of the optical fiber array 2 are aligned on optical axes of cores with inputs of the waveguides 22. The fixing position of the adapter 4 to the substrate 21 is determined by monitoring optical loss between each optical fiber of a pilot optical fiber array inserted into the guide aperture 4a of the adapter 4 and a corresponding one of the waveguides 22 under the condition that the position of the adapter 4 is finely adjusted to final out an optimum fixing position relative to the substrate 21. In accordance with an experiment held by the inventors, the optical coupling loss is less than 0.3 dB at one connection for the optical connections among the optical fibers of the optical fiber array 2 and the waveguides 22.

Figure 9A:
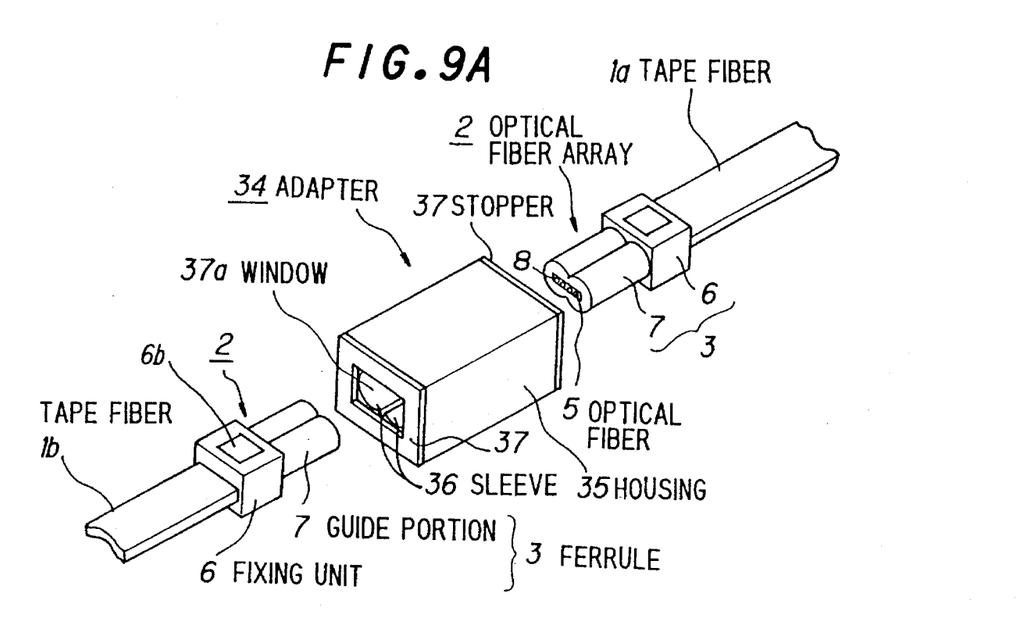
FIG. 9A and 9B are perspective views showing an optical fiber array structure in a third preferred embodiment according to the invention.
Figure 9B:
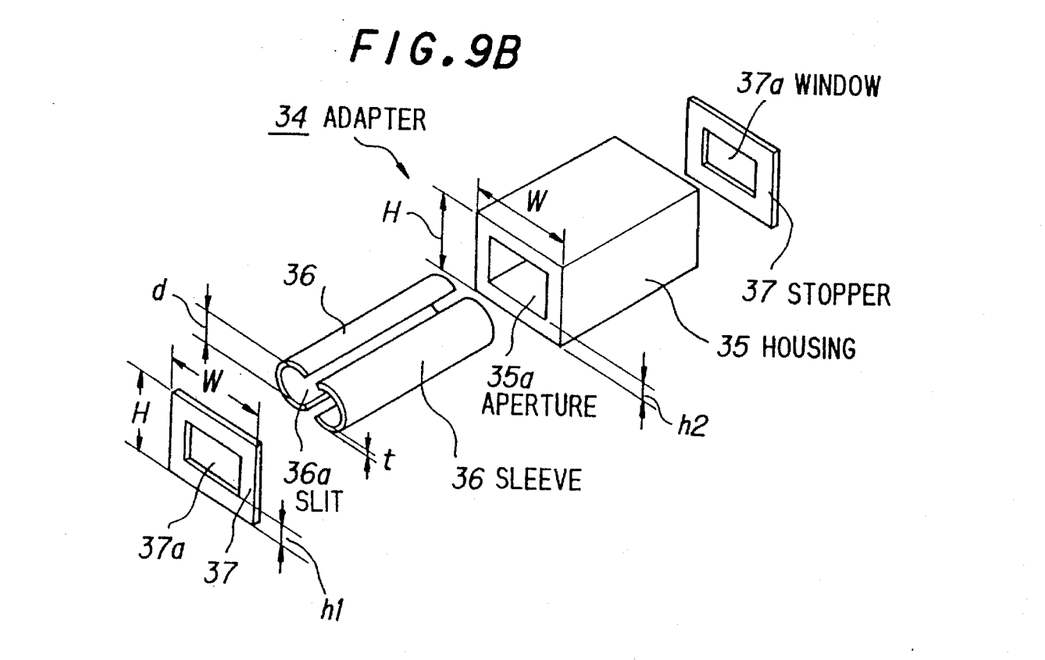

FIGS. 9A and 9B show an optical fiber array structure in the third preferred embodiment according to the invention, wherein like parts are indicated by like reference numerals as used in the first preferred embodiment.

In the third preferred embodiment, the optical fiber arrays 2 connected to the tape fibers 1a and 1b are to be optically connected to each other by using an adapter 34. FIG. 9B shows the detail of the adapter 34 which comprises a housing 35 of a width W and a height H having an aperture 35a, sleeves 36 having slits 36a of an inner diameter d and a thickness t, and stoppers 37 of the width W and the height H having windows 37a, wherein a height $h_1$ of the bottom side of the stopper 37 is greater than a height $h_2$ of the bottom side of the housing 35 by the thickness t.

Figure 10A:
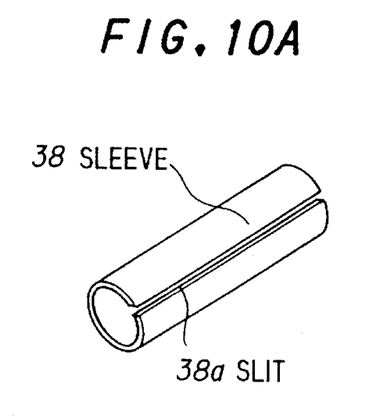
FIGS. 10A and 10B are perspective views showing two sleeves, one of which is used in the third preferred embodiment.
Figure 10B:
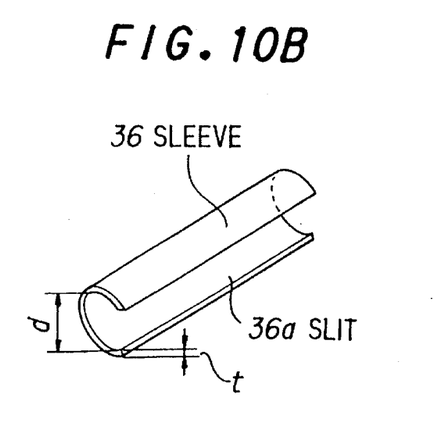

FIG. 10A shows a sleeve 38 having a slit 38a made of zirconia which is widely used for a connector of a optical fiber. This sleeve 38 is machined in the third preferred embodiment to be the sleeve 36 by enlarging the slit 38a to the slit 36a, as shown in FIG. 10B.

Figure 11A:
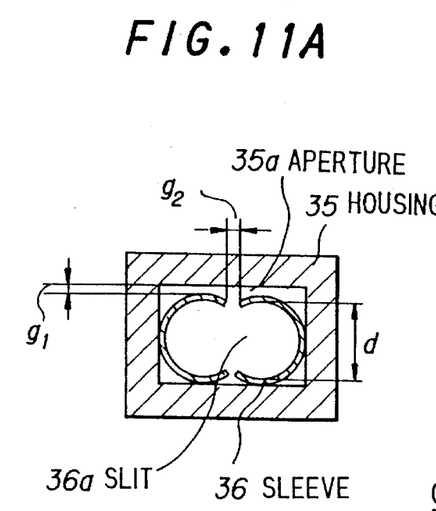
FIGS. 11A and 11B are cross-sectional views showing the optical fiber array structure in the third preferred embodiment.

The sleeves 36 thus machined are inserted into the aperture 35a of the housing 35, and the stoppers 37 are fixed to hold the sleeves 36 in the aperture 35a of the housing 35 to the both end planes of the housing 35, as shown in FIG. 9A and FIG. 11A. It is noted in FIG. 11A that the sleeves 36 has a gap $g_1$ relative to the inner wall of the aperture 35a of the housing 35 and a gap $g_2$ relative to each other at the facing ends thereof.

In the third preferred embodiment, it is set that the inner diameter d of the sleeves 36 is 2.49 mm, and an outer diameter D of the guide portions 7 of the optical fiber arrays 2 is 2.499±0.0005 mm.

Figure 11B:
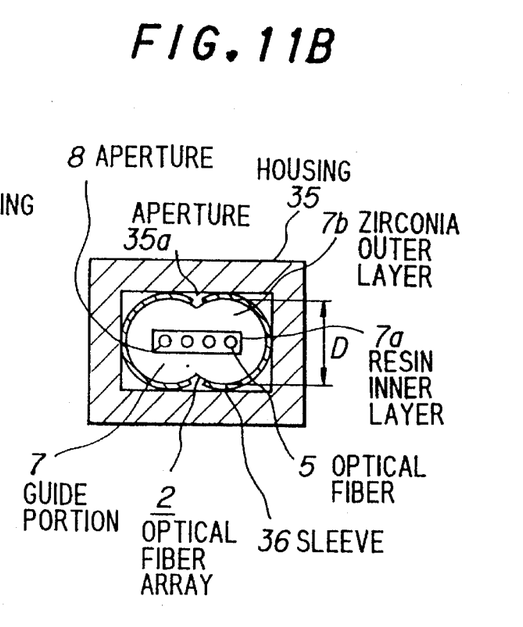

In optically connecting the optical fiber arrays 2 by using the adapter 34, the guide portions 7 are inserted via the openings 37a of the stoppers 37 into the sleeves 36 from the both sides of the adapter 34. Thus, the sleeves 36 are expanded to diminish the gap $g_1$ by resiliently holding the guide portion 7 of the diameter D (D>d) comprising the resin-made inner layer 7a and the zirconia-made outer layer 7b, as shown in FIG. 11B.

In the third preferred embodiment, the optical axial alignment having a precision of approximately 1 μm is obtained dependent on the outer configuration precision of the guide portion 7 between corresponding two optical fibers 5 among the optical fibers 5 held in the holding apertures 8 of the inner layer 7a of the guide portion 7, even if the inner surface precision of the sleeves 36 is approximately 0.01 mm.

In the first to third preferred embodiments, the inner and outer layers 7a and 7b of the guide portion 7 may be of zirconia ceramics, and the tape fibers 1a and 1b may be circular optical fiber cables.

In the comparison between the first and third preferred embodiments, it is confirmed that the commercial fabrication of optical fiber arrays is realized without using any high precision process in the third preferred embodiment, while the high precision process must be adopted in the first preferred embodiment to provide a commercial productivity. In other words, when the guide aperture 4a of the adapter 4 is formed by the machining having an ordinary precision in the first preferred embodiment, a yield under which the optical fiber arrays 2 are fabricated to provide a fine clearance of 0.5 μm between the guide portion 7 and the guide aperture 4a of the adapter 4 is as low as two pieces per 100 pieces. As a result, cost is increased to increase the yield by adopting the high precision process.

As explained in the first to third preferred embodiments, the advantages are obtained as follows.

(1) The multiple are ferrules are not rotated in the adapter, because the guide aperture of the adapter and the guide portion of the optical fiber array are complementary in non-circular configuration.

(2) When the guide portion is made of zirconia at least for an outer layer, the guide layer is fabricated with high precision to provide the optical axial alignment of high precision for optical fibers.

(3) When the guide portion is composed of the resin inner layer and the zirconia outer layer, the optical fibers are arranged in array with high precision to provide low loss-connections at a joint of the optical fiber arrays, etc.

(4) When the guide aperture is made by sleeves having slits, the adapter is fabricated with low cost by eliminating the machining process for the guide aperture. Thus, inner surface precision is lowered in the guide aperture of the adapter.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical fiber array structure comprising:

an optical fiber array comprising a plurality of optical fibers arranged in an array; and a ferrule provided around said optical fiber array, said optical fibers being exposed on an end plane of said ferrule to be coplanar with said end plane;

wherein said ferrule includes a guide portion formed of two cylinders mating each other along a length thereof to define a cross-sectional configuration of two circles.

2. An optical fiber array structure, according to claim 1, wherein:

said ferrule is of zirconia ceramics.

3. An optical fiber array structure, according to claim 1, wherein:

said ferrule comprises an outer layer and an inner layer, said outer layer being of zirconia ceramics, and said inner layer being of resin and having apertures for holding said optical fibers.

4. An optical fiber array structure, according to claim 3, wherein:

said resin is thermo-setting epoxy resin filled with glass filler.

5. An optical fiber array structure comprising:

an optical fiber array comprising a plurality of optical fibers arranged in an array;

a ferrule provided around said optical fiber array, said optical fibers being exposed on an end plane of said ferrule to be coplanar with said end plane; and an adapter having a guide aperture for receiving one end of said ferrule;

wherein said ferrule includes a guide portion formed of two cylinders mating each other along a length thereof; and said guide aperture has an inner configuration which is complementary with an outer configuration of said guide portion of said ferrule.

6. An optical fiber array structure, according to claim 5, wherein:

said ferrule further includes a fixing unit, said guide portion being received in said guide aperture of said adapter, and said fixing unit having an aperture for fixing said optical fibers extended out of an optical fiber cable therein by injecting adhesive into said aperture of said fixing unit, said fixing unit being positioned between said guide portion and said optical fiber cable.

7. An optical fiber array structure, according to claim 6, wherein:

said guide portion of said ferrule comprises an outer layer of zirconia ceramics and an inner layer of resin, said inner layer being integral with said fixing unit and having apertures for holding said optical fibers.

8. An optical fiber array structure, according to claim 7, wherein:

said resin is thermo-setting epoxy resin filled with glass fiber.

9. An optical fiber array structure, according to claim 6, wherein:

said aperture of said adapter is formed by two resilient sleeves, each of said two resilient sleeves having a longitudinal slit, and said two elastic sleeves facing each other at said slits.

10. An optical fiber array structure, according to claim 9, wherein:

a cross-sectional area of said aperture of said adapter is smaller than a cross-sectional area of said guide portion of said ferrule, whereby said two elastic sleeves are resiliently expanded by receiving said guide portion of said ferrule therein.

11. An optical fiber array structure, according to claim 10, wherein:

said two resilient sleeves are contained in a housing having a cross-section of rectangle and refrained from being out of said housing by stopping plates fixed on opposite sides to said housing, each of said stopping plates having a window for passing said ferrule.

* * * * *